US010968044B1

(12) United States Patent
Neumann et al.

(10) Patent No.: US 10,968,044 B1
(45) Date of Patent: Apr. 6, 2021

(54) CONVEYING SYSTEMS AND DROP LINK COMPONENTS

(71) Applicant: Transnorm System Gmbh, Harsum (DE)

(72) Inventors: Ondrej Neumann, Brno (CZ); Miroslav Kubo, Zilina (SK); Radim Mrazek, Hvozdec (CZ)

(73) Assignee: Transnorm System GmbH, Harsum (DE)

( * ) Notice: Subject to any disclaimer, the term of this patent is extended or adjusted under 35 U.S.C. 154(b) by 0 days.

(21) Appl. No.: 16/783,526

(22) Filed: Feb. 6, 2020

(51) Int. Cl.
*B65G 21/14* (2006.01)
*B65G 15/26* (2006.01)
*B65G 21/20* (2006.01)

(52) U.S. Cl.
CPC ............. *B65G 21/14* (2013.01); *B65G 15/26* (2013.01); *B65G 21/2081* (2013.01); *B65G 2201/04* (2013.01)

(58) Field of Classification Search
CPC .... B65G 21/14; B65G 15/26; B65G 21/2081; B65G 21/20772; B65G 2201/04
USPC .................................... 198/812, 836.1–836.4
See application file for complete search history.

(56) References Cited

U.S. PATENT DOCUMENTS

| | | | | |
|---|---|---|---|---|
| 4,641,745 A * | 2/1987 | Skates | ................ | B65G 21/2081 198/836.1 |
| 5,513,743 A * | 5/1996 | Brink | ................ | B65G 21/2081 198/836.1 |
| 7,571,802 B2 * | 8/2009 | Bowman | ............ | B65G 21/2081 198/836.1 |
| 8,186,502 B2 * | 5/2012 | Mackin | .................. | A01D 57/20 198/805 |
| 8,590,697 B2 * | 11/2013 | Lim | ....................... | B65G 21/02 198/860.1 |
| 9,682,646 B2 * | 6/2017 | Hazelton | ................... | B60P 1/38 |
| 2004/0031666 A1 * | 2/2004 | Ostman | ............. | B65G 21/2081 198/836.1 |
| 2014/0216897 A1 * | 8/2014 | Freehill | ............. | A01D 41/1217 198/594 |
| 2015/0144465 A1 * | 5/2015 | Rausch | ................. | B65G 21/14 198/812 |

(Continued)

OTHER PUBLICATIONS

Santa Rosa Systems, Inc., Single-Stage Telescopic Belt Conveyors, [online] [retrieved Apr. 29, 2020] retrieved from the Internet URL: https://srsinc.net/wp-content/uploads/2013/11/Single-stage_telescopic.pdf, 2 pages.

*Primary Examiner* — Mark A Deuble
(74) *Attorney, Agent, or Firm* — Alston & Bird LLP (57) ABSTRACT

Apparatuses, systems, and methods of manufacturing are described that provide a drop link and associated conveying system for item transport. An example conveying system includes a telescopic side guide that includes one or more sections and a plurality of drop links each supported by respective sections. Each drop link includes an extension mechanism that movably attaches the drop link to the section. Each extension mechanism allows translation of the drop link relative the respective section of the telescopic side guide between a retracted position and an extended position in which a portion of the drop link extends at least partially beyond an outer edge of the respective section of the telescopic side guide.

20 Claims, 6 Drawing Sheets

(56) References Cited

U.S. PATENT DOCUMENTS

2016/0137423 A1* 5/2016 Dunnwald ......... B65G 21/2081
                                                    198/818
2019/0062063 A1* 2/2019 Baek ................. B65G 21/2072

* cited by examiner

CONVEYING SYSTEMS AND DROP LINK COMPONENTS

TECHNOLOGICAL FIELD

Example embodiments of the present invention relate generally to material handling systems and, more particularly, to systems and apparatuses for improved item conveying.

BACKGROUND

Warehouses, distribution centers, and other material handling environments often rely on a number of components, systems, and the like for transporting items to and from various locations within these environments. During movement of the items, various systems (e.g., conveyors, robotic arms, or the like) may be used to reorient, position, and/or redirect these items. However, the inventors have identified numerous deficiencies with these existing technologies in the field, the remedies for which are the subject of the embodiments described herein.

BRIEF SUMMARY

Apparatuses, systems, and associated methods of manufacturing are provided for conveying systems for item transport and associated drop links. An example conveying system may include a telescopic side guide that includes one or more sections. The system may further include a plurality of drop links each supported by respective sections and each drop link may include an extension mechanism configured to movably attach the drop link to the section. Each extension mechanism may be configured to allow translation of the drop link relative the respective section of the telescopic side guide between a retracted position and an extended position in which a portion of the drop link extends at least partially beyond an outer edge of the respective section of the telescopic side guide.

In some embodiments, each extension mechanism may further include a grooved slot and each respective section may include a pin positioned within the grooved slot.

In some embodiments, the system may further include a conveying surface positioned substantially perpendicular with respect to the telescopic side guide. In such an embodiment, each drop link may be configured to, in the extended position, at least partially cover a gap between the conveying surface and the respective section of the telescopic side guide.

In some embodiments, each grooved slot may further define a first end that corresponds to the extended position and a second end opposite the first end that corresponds to the retracted position. In such an embodiment, each first end may be configured to limit vertical movement of each drop link relative to the respective section of the telescopic side guide.

In some embodiments, each drop link may further define a first edge located proximate the first end of the grooved slot such that the first edge remains housed by the respective section of the telescope side guide in an instance in which the drop link is in the extended position.

In some embodiments, each drop link may further define a second edge configured to extend beyond the outer edge of the respective section of the telescopic side guide in an instance in which the drop link is in the extended position.

In some embodiments, the telescopic side guide may be configured to move between a nested position in which the sections of the telescopic side guide are sequentially nested in one another and an operational position in which at least one of the one or more sections extends beyond an outer edge of an adjacent section. In the nested position, the drop links of each nested section of the telescopic side guide may be positioned in the retracted position.

An example drop link may include a body configured to be received by a section of a telescopic side guide of a conveying system. The drop link may further include an extension mechanism configured to movably attach the body to the section of the telescopic side guide. The extension mechanism may be configured to allow translation of the body relative the section of the telescopic side guide between a retracted position, and an extended position in which a portion of the body extends at least partially beyond an outer edge of the section of the telescopic side guide.

In some embodiments, the extension mechanism further comprises a grooved slot configured to receive a pin of the section of the telescopic side guide therein. In such an embodiment, the grooved slot may be positioned substantially perpendicular with respect to a conveying surface of the conveying system.

In a further embodiment, the body may be configured to, in the extended position, at least partially cover a gap between the conveying surface and the section of the telescopic side guide.

In some embodiments, the grooved slot may further define a first end that corresponds to the extended position and a second end opposite the first end that corresponds to the retracted position. In such an embodiment, the first end may be configured to limit vertical movement of the body relative to the section of the telescopic side guide.

In some embodiments, the body may further define a first edge located proximate the first end of the grooved slot such that the first edge remains housed by the section of the telescope side guide in an instance in which the body is in the extended position. In further embodiments, the body may define a second edge configured to extend beyond the outer edge of the section of the telescopic side guide in an instance in which the body is in the extended position.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

Conveying System

Figure 1:
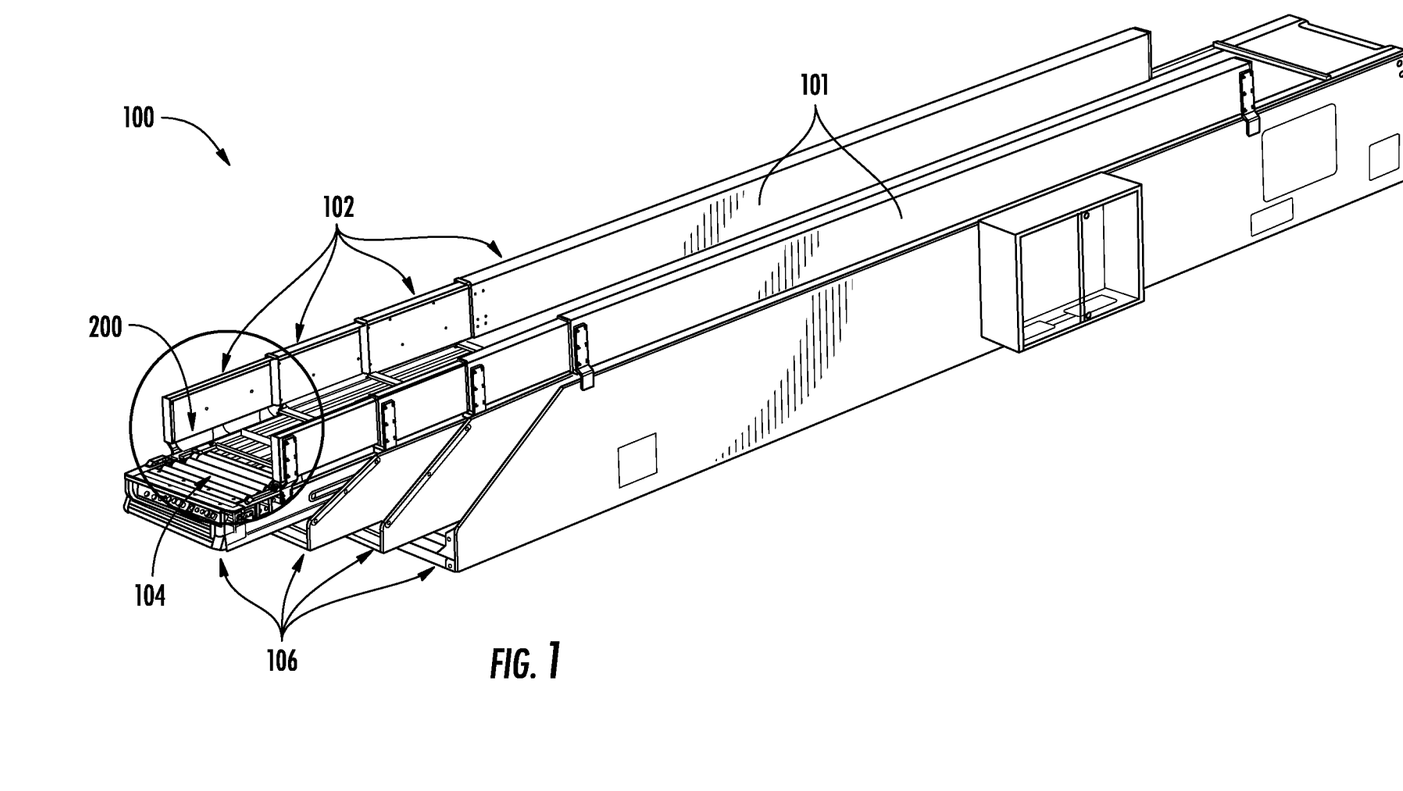
FIG. 1 is a perspective view of a conveying system according to an example embodiment.

With reference to FIG. 1, an example conveying system 100 is illustrated. As shown, the conveying system 100 is configured to support one or more items (e.g., articles, packages, boxes, etc.) and to facilitate movement of these items. The conveying system 100 is illustrated with a conveying surface 104 that operates as a carrying medium (e.g., endless loop between two pulleys or drums) and is configured to, when powered by a motor (not shown), move items supported by the conveying surface 104 via contact and frictional engagement with these items. The conveying system 100 is further configured as a telescopic conveyor in which a plurality of extending conveyor stages 106 may each support respective carrying mediums that combine to form the conveying surface 104. In an instance in which items are initially out of reach of the conveying system 100, for example, one or more of the extending conveyor stages 106 may extend such that the overall length (e.g., reach) of the conveying system 100 is extended. In order to reduce the footprint (e.g., overall size and shape) of the conveying system 100, the plurality of extending conveyor stages 106 may be dimensioned (e.g., sized and shape) so as to nest one inside the other as illustrated in FIG. 2C. As such, the conveyor stages 106 may be at least partially housed by an adjacent conveyor stages 106 to reduce the size of the conveying system 100 when not in use, when items are located proximate the conveying system 100, and/or the like.

During movement of the items along the conveying surface 104, however, one or more of the items may be driven (e.g., via movement of the conveying surface 104, via contact with other items, etc.) to an exterior edge of the conveying surface 104 (e.g., a conveying belt not shown). In order to prevent items from unintentionally exiting the conveying system 100 (e.g., falling off of the conveying surface 104), the conveying system 100 may include telescoping side guides 101. As shown in FIG. 1, the telescoping side guides 101 may be formed of a plurality of sections 102 (e.g., first section 201, second section 203, and/or third section 205 in FIG. 2C) that match a corresponding extending conveyor stage 106 and, in some embodiments, are positioned substantially perpendicular with respect to the conveying surface 104. Although described herein with reference to a pair (i.e., two) telescopic side guides 101 positioned along a length of and substantially perpendicular with the conveying surface 104, the present disclosure contemplates that the conveying system 100 may include any number of telescopic side guides 101 at any position or orientation based upon the intended application of the conveying system 100. Furthermore, each telescopic side guide 101 may include any number of sections 102 based upon the number of extending conveying stages 106 and/or based on the intended application of the conveying system 100.

Figure 2A:
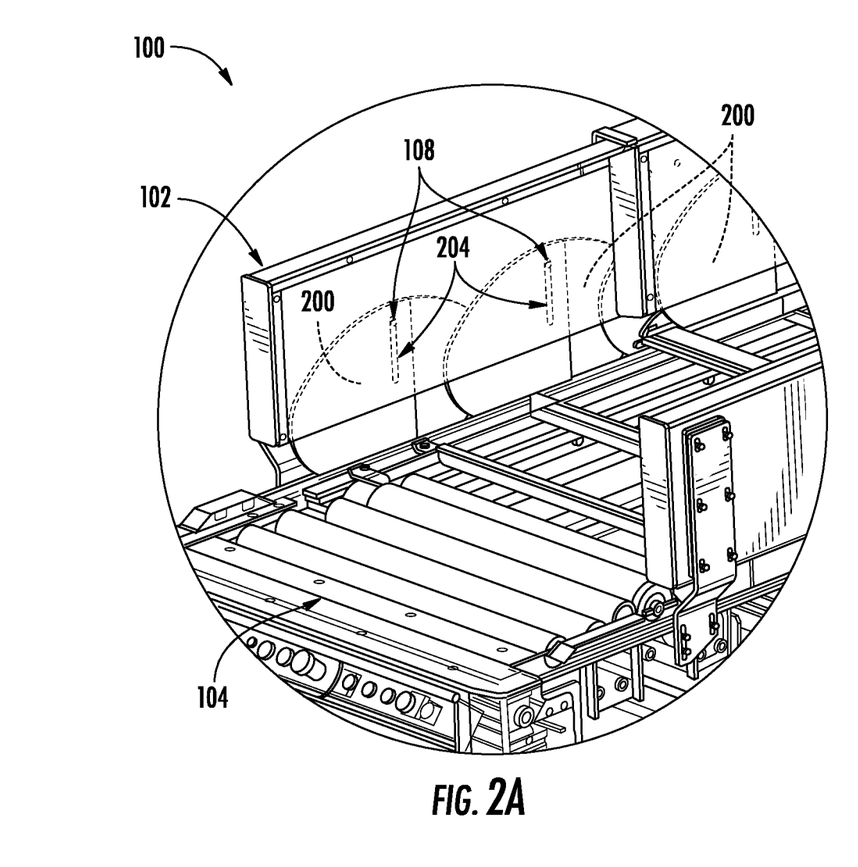
FIG. 2A is a perspective view of an example telescopic side guide according to an example embodiment.
Figure 2B:
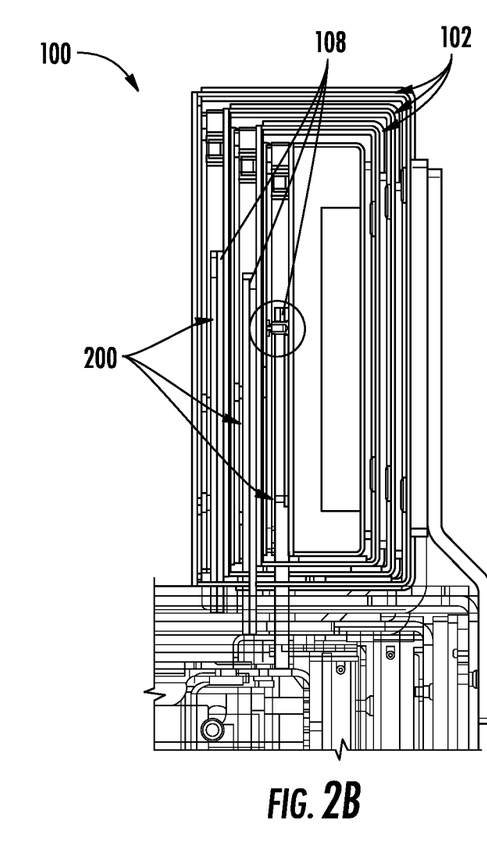
FIG. 2B is a cross-sectional view of the telescopic side guide of FIG. 2A according to an example embodiment.
Figure 2C:
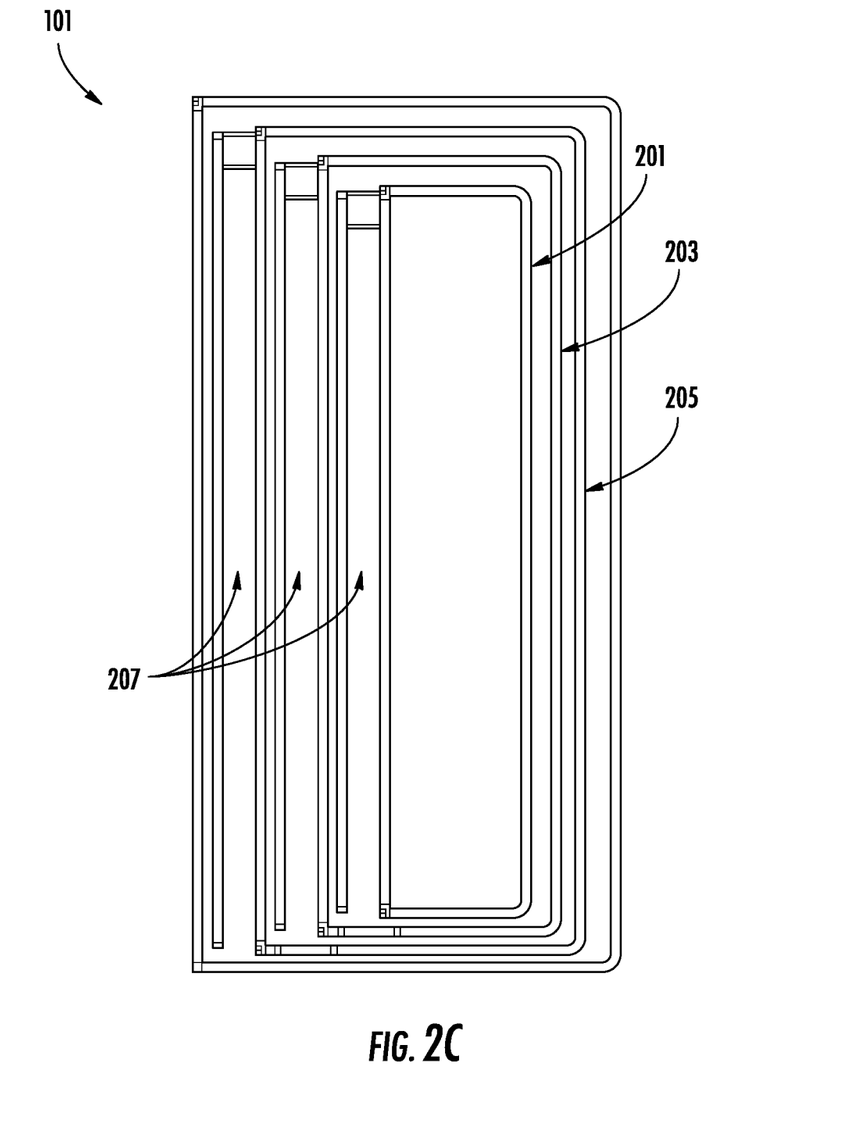
FIG. 2C is another cross-sectional view of the telescopic side guide of FIG. 2A according to an example embodiment.

As illustrated in FIGS. 2A-2C, the telescopic side guides 101 may be configured or otherwise dimensioned (e.g., sized and shaped) to move between a nested position and an operational position similar to the nesting of the extending conveying stages 106. In particular, the telescoping side guides 101 may move between a nested position in which the sections 102 of the telescopic side guides 101 are sequentially nested in one another and an operational position in which at least one of the one or more sections 102 extends beyond an outer edge of an adjacent section 102. Although the telescopic side guides 101 may operate to prevent some items for exiting the conveying system 100 (e.g., falling off of the sides), the telescopic side guides 101 may be unable to prevent small items, debris, etc. from falling between the telescopic side guides 101 and the conveying surface 104.

As evident in the conveying system 100 illustrated in FIG. 2A, a gap (e.g., space, crevice, etc.) may exist between the conveying surface 104 and the telescoping side guides 101 due to the dimensions (e.g., size and shape) of these elements required for the nesting feature described above. During operation, such a gap may receive small items, debris, or the like that may be lodged between the conveying surface 104 and the telescoping side guides 101 resulting in damage to the items and/or components of the conveying system 100. As such, the conveying system 100 may employ one or more drop links 200, as described hereafter with reference to FIGS. 3-5B, in order to cover any gap between the conveying surface 1004 and the respective section 102 of the telescopic side guide 101. In doing so, the conveying system 100 and associated drop links 200 of the present application may prevent damage to items carried by telescoping conveyors, prevent damage to conveying systems, and further improve efficiency of such systems by reducing required maintenance associated with these issues.

As illustrated in FIG. 2C, the telescoping side guides 101 may be formed of a plurality of sections 102 that may nest one inside the other. Each section (e.g., first section 201, second section 203, and third section 205) may be formed and shaped as a closed profile (e.g., rigid, hollow structure) such that the telescopic side guides 101 of the present application may be used to retrofit existing systems that lack telescopic capabilities. Additionally, the closed profile shape illustrated in FIG. 2C may operate to provide a robust and stiff solution that resists the often harsh conditions associated with distribution applications. As shown, each section 102 may be dimensioned (e.g., sized and shaped) with a rectangular cross-section with one or more rounded corners (e.g., a chamfered or beveled edge of each section 102).

With continued reference to FIG. 2C, each section 102 of the telescopic side guides 101 may define a recess 207 (e.g., spacing, slot, niche, channel, groove, etc.). As shown, each recess 207 may be formed adjacent the closed profile shape of the respective section 102 described above. In this way, the rigidity and strength of the telescopic side guide 101 may be maintained while offering additional functionality (e.g., the drop links 200 described hereafter). Each recess 207 may be dimensioned (e.g., sized and shaped) so as to receive at least a portion of a respective drop link 200 therein. As described hereafter, each drop link 200 may move between retracted and extended positions in which a varying portion of each drop link 200 may be located within a respective recess 207.

Drop Link

Figure 3:
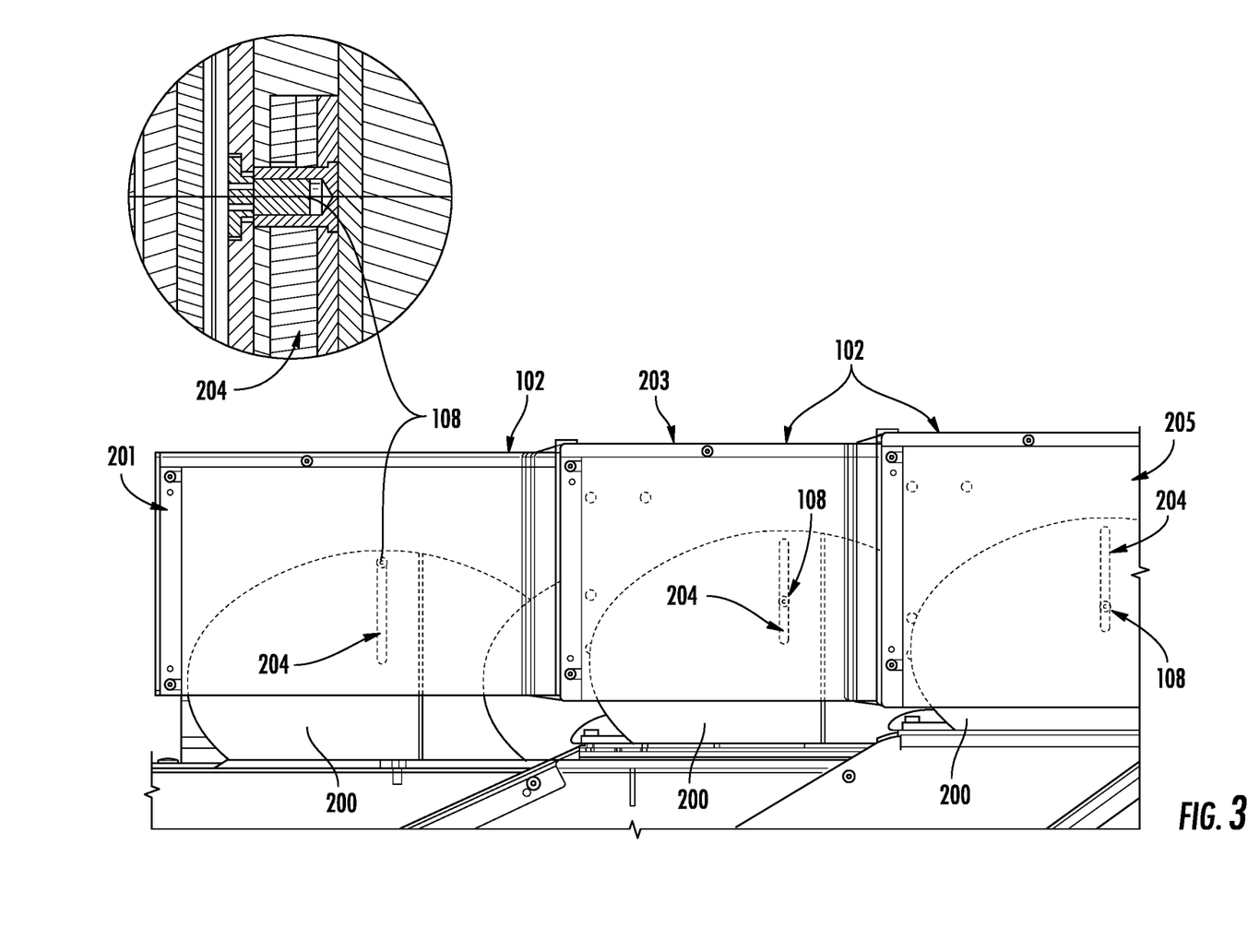
FIG. 3 is a front view of a plurality of sections of a telescopic side guide with associated drop links according to an example embodiment.

With reference to FIGS. 2A, 2B, and 3 an example drop link 200 is illustrated installed in a telescopic side guide 101 of the example conveying system 100. As shown, the drop link 200 may define a body configured to be received by a section 102 of a telescopic side guide 101. As shown, the one or more sections 102 of the telescoping side guide 101 may be configured to receive one or more drop links 200 therein such that the section 102 operates to house (e.g., enclose, support, etc.) at least a portion of the drop links 200. With reference to the cross-sectional view of FIG. 2B, each section 102 is illustrated supporting at least a portion of a drop link 200 based upon the position of the drop link 200 (e.g., a retracted or extended position as described hereafter). As shown in FIG. 2A, each section 102 of the telescopic side guide 101 may further be configured to receive a plurality of drop links 200. By way of example, in instances in which the length of the respective section 102 is such that an extended gap or multiple gaps may exist between the conveying surface 104 and the telescopic side guide 101, the telescopic side guide 101 may support a plurality of drop links 200 to cover the extended gap or plurality of gaps.

Figure 4:
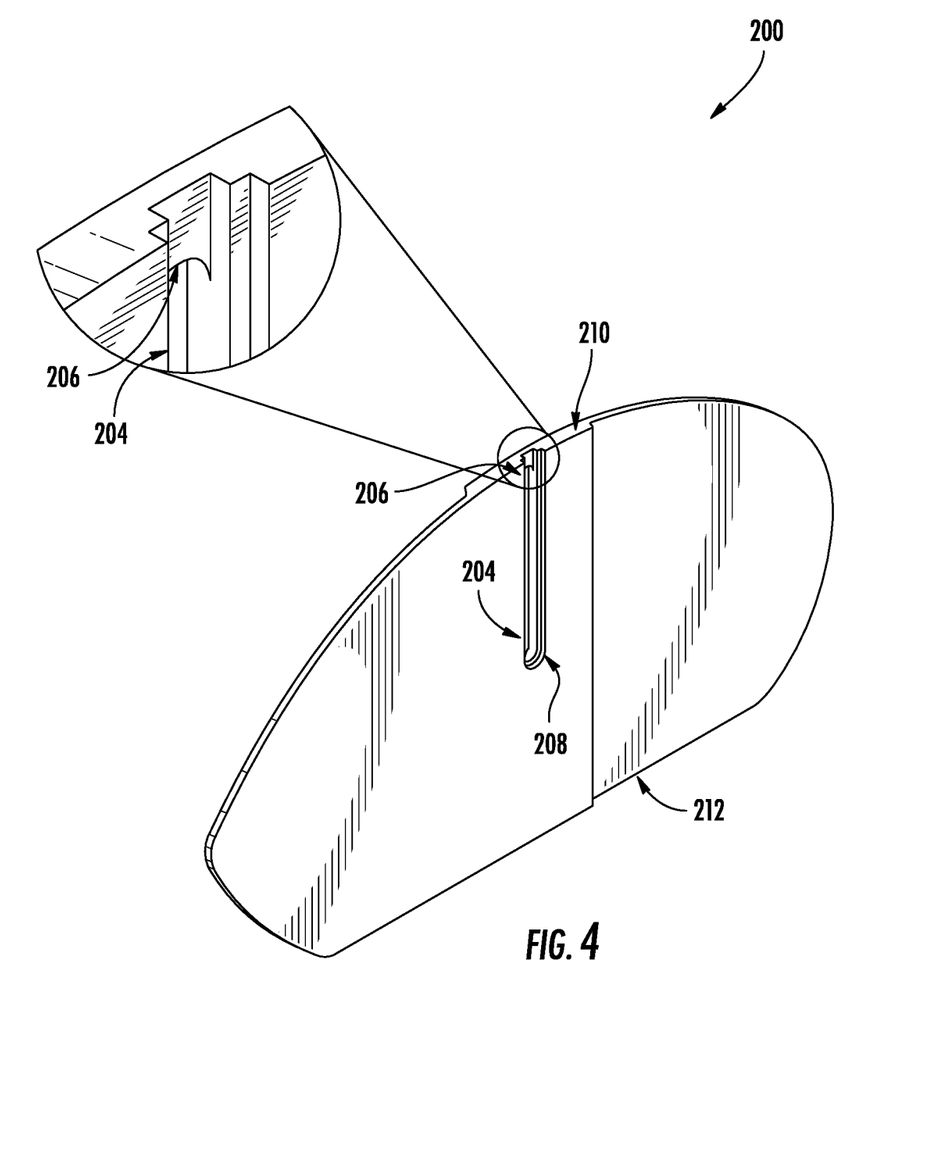
FIG. 4 is a front perspective view of an example drop link according to an example embodiment.

With reference to FIGS. 3-4, the drop link 200 may further include an extension mechanism 204 configured to movably attach the body (e.g., the drop link 200) to the section 102 of the telescopic side guide 101. The extension mechanism 204 may be configured to allow translation of the body of the drop link 200 relative to (e.g., with respect to) the section 102. By way of example, the extension mechanism 204 may include a grooved slot (e.g., recess, channel, groove, socket, etc.) that, when received by the section 102, receives a corresponding pin 108 (e.g., knob, extension, lever, latch, stud, protrusion, etc.) of the section 102. In such an embodiment, the grooved slot may be positioned substantially perpendicular with respect to the conveying surface 104 so as to provide vertical translation (e.g., translation in a plane positioned substantially perpendicular with respect to the conveying surface 104) of the drop link 200 with respect to the conveying surface 104. Although described herein with reference to telescopic side guides 101 and extension mechanisms 204 positioned parallel to the conveying surface 104, the present disclosure contemplates that the telescopic side guides 101 and extension mechanism 204 may be located at any orientation so as to provide the functionality described herein (e.g., so as to at least partially cover the gap as described above).

With continued reference to FIG. 3, the extension mechanism 204 may be configured to allow translation of the drop link 200 (e.g., the body of the drop link 200) between a retracted position and an extended position. In the extended position, at least a portion of the drop link 200 may extend at least partially beyond an outer edge of the section 102 of the telescopic side guide 101. As shown in FIG. 3, the pin 108 of the section 102 of the telescopic side guide 101 may be configured to move within (e.g., vertically) the grooved slot (e.g., extension mechanism 204) such that the drop link 200 may extend beyond an outer edge of (e.g., outside of) the section 102. Said differently, as each section 102 of the telescopic side guides 101 extend from a nested position as describe above, gravity (e.g., the downward force of gravity) acts on the drop link 200 such that the drop link translates vertically until in contact with another element of the conveying system 100 or until the pin 108 is stopped by the end of the extension mechanism 204 (e.g., the first end 206 in FIG. 4). Similarly, in an instance in which each of the sections 102 are nested in an adjacent section, the drop links 200 of each nested section 102 may be positioned in the retracted position. Said differently, in the nested position each drop link 200 may rest or be otherwise supported by the conveying system 100 such that each drop link 200 is substantially enclosed by its respective section 102.

Although described herein with reference to a retracted position and an extended position, the present disclosure contemplates that any position of the pin 108 within the extension mechanism 204 (e.g., grooved slot) in which a portion of the drop link 200 extends beyond an outer edge of the section 102 that would otherwise be enclosed by the section 102 may refer to the extended position. Said differently, in some embodiments, a portion of the drop link 200 may always extend beyond an outer edge of the section 102 even when in the retracted position. In such an embodiment, the extended position therefore refers to any position in which a portion of the body of the drop link 200 that is otherwise covered by the section 102 extends beyond an outer edge of the section 102 so as to cover the gap between the conveying surface 104 and the section 102. By way of example, the telescopic side guide of FIG. 3 is illustrated with a first section 201, a second section 203, and a third section 205 each of which is in the extended position (e.g., the pin 108 is not located at the second end of the extension mechanism 204 as described hereafter). The first section 201 is fully extended (e.g., vertical movement of the drop link 200 is stopped by the first end of the groove), the second section 203 is partially extended (e.g., the pin 108 is located between the fully retracted and the fully extended positions), and the third section 204 is partially retracted (e.g., the pin 108 is located proximate the second end of the groove). Although not illustrated in FIG. 3, in some embodiments, the retracted position may refer to an instance in which the entire drop link 200 is enclosed by the section 102.

Figure 5A:
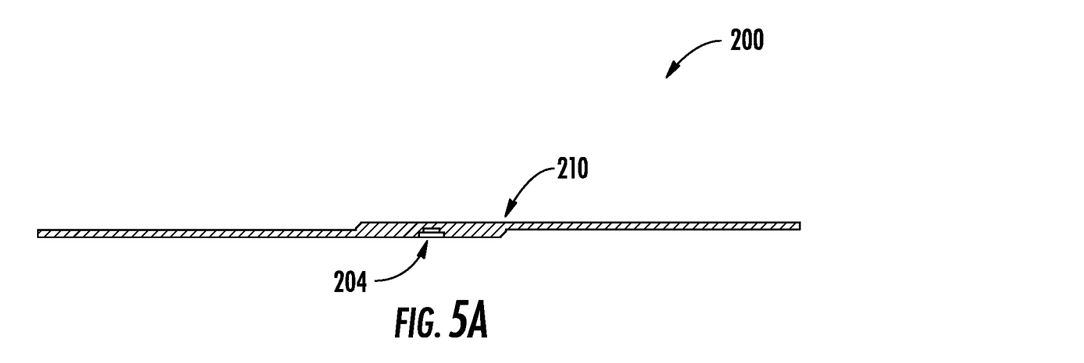
FIG. 5A is a top view of the drop link of FIG. 4 according to an example embodiment.
Figure 5B:
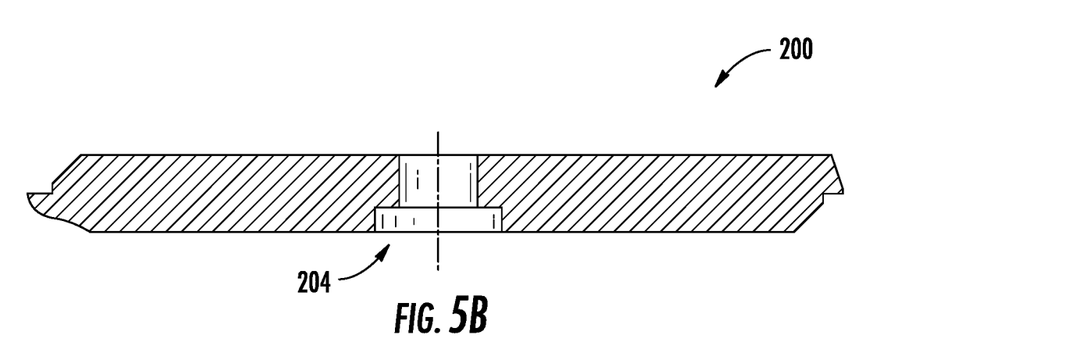
FIG. 5B is cross-sectional view of the drop link of FIG. 4 according to an example embodiment.

With reference to FIGS. 4-5B, the extending mechanism 204 (e.g., grooved slot) of the drop link 200 may define a first end 206 and a second end 208 opposite the first end 206. As shown, in an instance in which the pin 108 is located in the second end 208 of the extension mechanism 204, the drop link 200 may be located in the fully retracted position such that the second end 208 corresponds to the retracted position. Similarly, in an instance in which the pin 108 is located in the first end 206 of the extension mechanism 204, the drop link 200 may be located in the fully extended position such that the first end 206 corresponds to the extended position. In this way, the first end 206 may operate to limit vertical movement of the drop link 200 (e.g., the body of the drop link 200) relative to the section 102 of the telescopic side guide. Said differently, although gravity may act on the drop link 200 so as to pull the drop link towards the extended position, the first end 206 of the extension mechanism 204 (e.g., grooved slot) may operate to set the end point of the vertical movement of the drop link 200 to prevent unintended contact between the conveying surface 104 and the sections 102.

With continued reference to FIGS. 4-5B, the drop link 200 may further define a first edge 210 located proximate the first end 206 of the grooved slot (e.g., extension mechanism 204). As is evident by the description herein, the drop link 200 may be configured such that the first edge 210 remains housed by the section 102 of the telescope side guide 101 in an instance in which the drop link 200 is in the extended position. Said differently, the first edge 210 may be at any location of the drop link 200 between the first end 206 and the second end 208 located within the section 102. Additionally, the drop link 200 may further define a second edge 212 opposite the first edge 210 and configured to extend beyond the outer edge of the section 102 of the telescopic side guide 101 in an instance in which the drop link 200 is in the extended position. Said differently, the second edge 212 may be configured to cover (e.g., shield or the like) any gap between the associated section 102 of the telescopic side guide 101 and the conveying surface 104.

Although illustrated herein as a substantially circular and substantially thin plate, the present disclosure contemplates that the drop links 200 described herein may be dimensioned (e.g., sized and shaped) to accommodate any conveying system or for use in any material handling environment. Furthermore, the drop links 200 may be formed via an injection molding process or related manufacturing techniques. In some embodiments, the drop links 200 may be formed of a material having a relatively low coefficient of friction so as to facilitate translational movement of the drop links 200 relative the sections 102 of the telescopic side guides 101.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A drop link comprising:
   a body configured to be received by a section of a telescopic side guide of a conveying system; and
   an extension mechanism configured to movably attach the body to the section of the telescopic side guide, wherein the extension mechanism is configured to allow translation of the body relative the section of the telescopic side guide between:
   a retracted position, and
   an extended position in which a portion of the body extends at least partially beyond an outer edge of the section of the telescopic side guide.

2. The drop link according to claim 1, wherein the extension mechanism further comprises a grooved slot configured to receive a pin of the section of the telescopic side guide therein.

3. The drop link according to claim 2, wherein the grooved slot is positioned substantially perpendicular with respect to a conveying surface of the conveying system.

4. The drop link according to claim 3, wherein the body is configured to, in the extended position, at least partially cover a gap between the conveying surface and the section of the telescopic side guide.

5. The drop link according to claim 2, wherein the grooved slot further defines:
   a first end that corresponds to the extended position; and
   a second end opposite the first end that corresponds to the retracted position.

6. The drop link according to claim 5, wherein the first end is configured to limit vertical movement of the body relative to the section of the telescopic side guide.

7. The drop link according to claim 2, wherein the body further defines a first edge located proximate the first end of the grooved slot such that the first edge remains housed by the section of the telescope side guide in an instance in which the body is in the extended position.

8. The drop link according to claim 2, wherein the body further defines a second edge configured to extend beyond the outer edge of the section of the telescopic side guide in an instance in which the body is in the extended position.

9. A conveying system for item transport, the conveying system comprising:
   a telescopic side guide comprising one or more sections; and
   a plurality of drop links each supported by respective sections, wherein each drop link comprises an extension mechanism configured to movably attach the drop link to the section,
   wherein each extension mechanism is configured to allow translation of the drop link relative the respective section of the telescopic side guide between:
   a retracted position, and
   an extended position in which a portion of the drop link extends at least partially beyond an outer edge of the respective section of the telescopic side guide.

10. The conveying system according to claim 9, wherein each extension mechanism further comprises a grooved slot and the respective section comprises a pin positioned within the grooved slot.

11. The conveying system according to claim 10, further comprising a conveying surface positioned substantially perpendicular with respect to the telescopic side guide.

12. The conveying system according to claim 10, wherein each drop link is configured to, in the extended position, at least partially cover a gap between the conveying surface and the respective section of the telescopic side guide.

13. The conveying system according to claim 10, wherein each grooved slot further defines:
   a first end that corresponds to the extended position; and
   a second end opposite the first end that corresponds to the retracted position.

14. The conveying system according to claim 13, wherein each first end is configured to limit vertical movement of each drop link relative to the respective section of the telescopic side guide.

15. The conveying system according to claim 10, wherein each drop link further defines a first edge located proximate the first end of the grooved slot such that the first edge remains housed by the respective section of the telescope side guide in an instance in which the drop link is in the extended position.

16. The conveying system according to claim 10, wherein each drop link further defines a second edge configured to extend beyond the outer edge of the respective section of the telescopic side guide in an instance in which the drop link is in the extended position.

17. The conveying system according to claim 9, wherein the telescopic side guide is configured to move between:
   a nested position in which the sections of the telescopic side guide are sequentially nested in one another; and
   an operational position in which at least one of the one or more sections extends beyond an outer edge of an adjacent section.

18. The conveying system according to claim 17, wherein, in the nested position, the drop links of each nested section of the telescopic side guide are positioned in the retracted position.

19. The conveying system according to claim 9, wherein each section of the telescopic side guide is formed as a closed profile.

20. A method of manufacturing a drop link, the method comprising:
   providing a body configured to be received by a section of a telescopic side guide of a conveying system; and
   providing an extension mechanism configured to movably attach the body to the section of the telescopic side guide, wherein the extension mechanism is configured to allow translation of the body relative the section of the telescopic side guide between:
   a retracted position, and
   an extended position in which a portion of the body extends at least partially beyond an outer edge of the section of the telescopic side guide.

\* \* \* \* \*